(12) United States Patent
Huang

(10) Patent No.: US 7,778,017 B2
(45) Date of Patent: Aug. 17, 2010

(54) CLAMP-TYPE HARD DISK MOUNT

(76) Inventor: Jui-Shu Huang, No. 203, Jen-He Rd. Daxi Cheng, Taoyuan 335 (TW)

( * ) Notice: Subject to any disclaimer, the term of this patent is extended or adjusted under 35 U.S.C. 154(b) by 190 days.

(21) Appl. No.: 12/222,469

(22) Filed: Aug. 11, 2008

(65) Prior Publication Data

US 2009/0294618 A1 Dec. 3, 2009

(30) Foreign Application Priority Data

Jun. 2, 2008 (TW) .............................. 97209678 U

(51) Int. Cl.
*G06F 1/16* (2006.01)
(52) U.S. Cl. .................... 361/679.2; 720/604; 248/318; 269/32
(58) Field of Classification Search .................. 720/616, 720/604, 651, 619; 361/699, 704, 679.31, 361/679.43, 679.34, 679.41, 679.48; 324/158.1; 248/521, 524, 226.11, 318, 316.1; 269/236, 269/6, 32; 360/97.01, 244.6
See application file for complete search history.

(56) References Cited

U.S. PATENT DOCUMENTS

| | | | | |
|---|---|---|---|---|
| 5,812,511 | A | * | 9/1998 | Kawamura et al. .......... 720/616 |
| 6,124,707 | A | * | 9/2000 | Kim et al. ................ 324/158.1 |
| 2008/0259566 | A1 | * | 10/2008 | Fried .......................... 361/699 |

* cited by examiner

*Primary Examiner*—Hung V Duong
(74) *Attorney, Agent, or Firm*—Rosenberg, Klein & Lee

(57) ABSTRACT

A clamp-type hard disk (hard disk) mount includes a base having a hard disk contact surface; two clamping arms pivotally connected at rear ends to two fulcrums provided in and near two lateral ends of the base; and two restoring elements disposed in the base. The two clamping arms respectively have an extension section rearward extended beyond the two fulcrums. Two short rods are separately provided near front ends of the two clamping arms corresponding to two retaining hole provided on two lateral sides of a hard disk. The restoring elements normally push the extension sections of the clamping arms outward, so that the two clamping arms automatically clamp on the two lateral sides of a hard disk installed on the clamp-type hard disk mount.

4 Claims, 6 Drawing Sheets

CLAMP-TYPE HARD DISK MOUNT

FIELD OF THE INVENTION

The present invention relates to a clamp-type hard disk mount, and more particularly to a clamp-type hard disk mount that allows a hard disk to be quickly installed thereon and removed therefrom without the need of using any tool.

BACKGROUND OF THE INVENTION

Currently, when installing a hard disk in a computer case, the hard disk is first installed on a hard disk mount and then the hard disk mount along with the hard disk are mounted to the computer case. In general, the hard disk is fixed to the hard disk mount by a plurality of screws, which are threaded into locking holes formed on two sides of the hard disk mount, so as to lock the hard disk to the hard disk mount.

For the hard disk installed on the hard disk mount to stay in a uniformly stressed state, it is necessary to use a considerable number of screws at each of two lateral sides of the hard disk mount to lock the hard disk to the hard disk mount. However, it is troublesome to tighten and loosen these screws when installing and removing the hard disk on and from the hard disk mount.

Taiwanese Patent No. 289962 discloses a hard disk mount that allows a hard disk to be quickly installed thereon and removed therefrom without the need of using any tool. The hard disk mount includes a fixing bottom, a fixing sidewall, a connecting base, a movable bracket, and a connecting plate extended from the fixing bottom. The movable bracket is mounted on the connecting base. A pivot shaft is extended through a first pivot section on the connecting base and a second pivot section on the movable bracket to pivotally connect the movable bracket to the connecting base. A hard disk can be installed in a receiving space defined by the fixing bottom, the fixing sidewall, and the movable bracket. And, locking elements on the connecting plate can be locked in retaining holes formed on the movable bracket to thereby fix the hard disk in the hard disk mount.

While the hard disk mount disclosed in Taiwanese Patent No. 289962 allows a hard disk to be quickly installed thereon and removed therefrom without the need of using any tool, the pivot shaft and the connecting plate are required to install the hard disk on the hard disk mount.

SUMMARY OF THE INVENTION

A primary object of the present invention is to provide a clamp-type hard disk mount that allows a hard disk to be quickly installed thereon and removed therefrom without the need of using any tool or any pivot shaft.

To achieve the above and other objects, the clamp-type hard disk mount according to the present invention includes a base having a hard disk contact surface; two clamping arms pivotally connected at rear ends to two fulcrums provided in and near two lateral ends of the base; and two restoring elements disposed in the base. The two clamping arms respectively have an extension section rearward extended beyond the two fulcrums. Two short rods are separately provided near front ends of the two clamping arms corresponding to two retaining hole provided on two lateral sides of a hard disk. The restoring elements normally push the extension sections of the clamping arms outward, so that the two clamping arms automatically clamp on the two lateral sides of a hard disk installed on the clamp-type hard disk mount.

With the above arrangements, when it is desired to install a hard disk on the clamp-type hard disk mount or remove the hard disk from the clamp-type hard disk mount, simply apply two laterally outward forces to pull the two clamping arms away from each other. When the two clamping arms clamp on the hard disk, the two short rods at the front ends of the clamping arms are engaged with the retaining holes on the hard disk. Accordingly, it is not necessary to tighten and loosen any screws during installing and removing the hard disk on and from the clamp-type hard disk mount.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
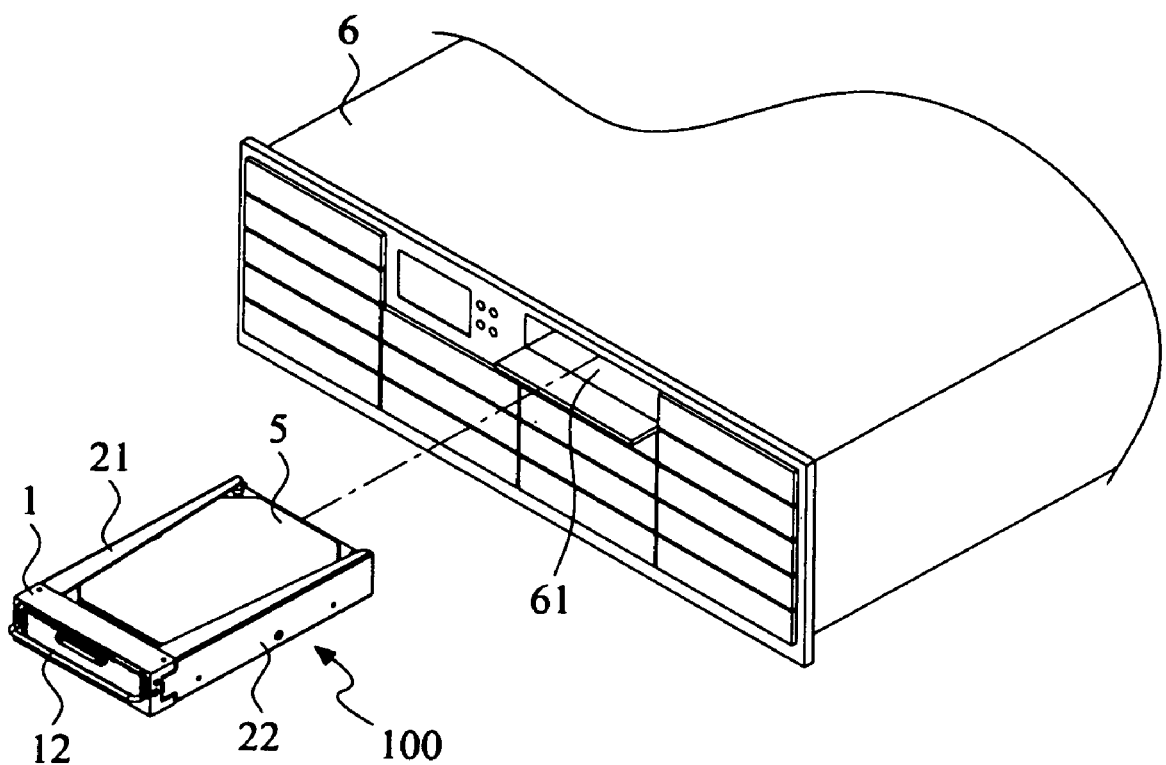
FIG. 1 is a perspective view showing a hard disk installed on a clamp-type hard disk mount according to the present invention before the latter is pushed into a server.

Please refer to FIG. 1 that shows a hard disk 5 is installed on a clamp-type hard disk mount 100 of the present invention before the hard disk mount 100 is pushed into one of many hard disk bays 61 on a server 6. As shown, the clamp-type hard disk mount 100 has two clamping arms 21, 22 located at two lateral sides thereof adapted to clamp on two lateral sides of the hard disk 5 installed thereon. The hard disk 5 together with the hard disk mount 100 can be then pushed into the hard disk bay 61 from a front side of the server 6. When it is desired to remove the hard disk 5 from the server 6, a user needs only to pull at a handle 12 provided at a rear end of the hard disk mount 100, and the hard disk mount 100 along with the hard disk 5 installed thereon can be easily removed from the server 6.

Figure 2:
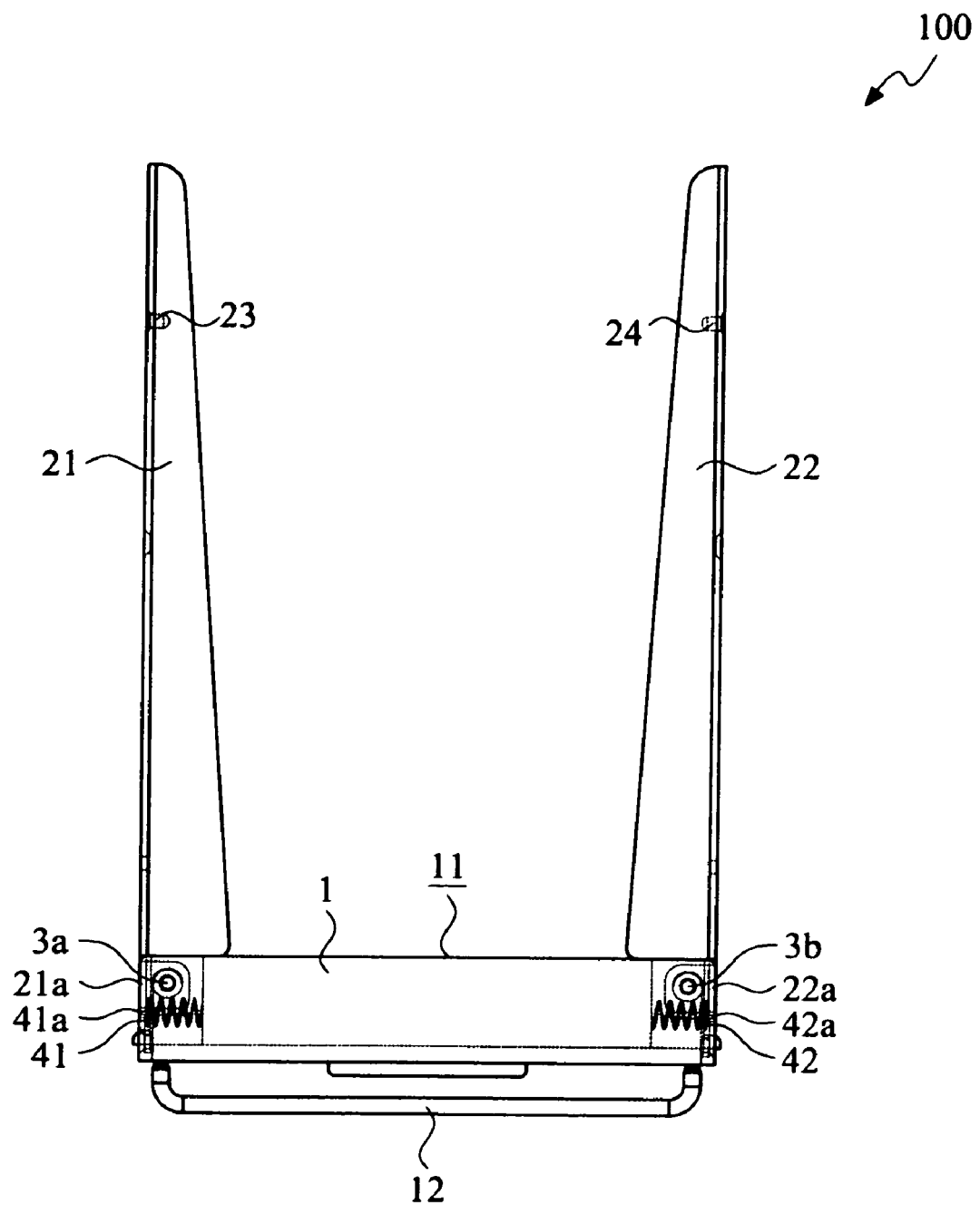
FIG. 2 is a partially sectioned top plan view of a clamp-type hard disk mount according to a first embodiment of the present invention.

Please refer to FIG. 2 that is a partially sectioned top plan view of a clamp-type hard disk mount 100 according to a first embodiment of the present invention. As shown, the clamp-type hard disk mount 100 includes a base 1 being provided on a front side with a hard disk contact surface 11 and on a rear side with a handle 12. By gripping at the handle 12, a user may easily pull the hard disk mount 100 to remove it from a hard disk bay. The clamp-type hard disk mount 100 further includes two clamping arms 21, 22 that are pivotally connected near respective rear ends to two fulcrums 3a, 3b provided in and near two lateral ends of the base 1, so as to forward extend from the two lateral ends of the base 1. The clamping arms 21, 22 respectively have an extension section 21a, 22a rearward extended beyond the fulcrums 3a, 3b. Two short rods 23, 24 are respectively provided near front ends of the clamping arms 21, 22 corresponding to two retaining holes 5a, 5b formed on two lateral sides of a hard disk 5. Two restoring elements 41, 42 are provided in the base 1 with two push ends 41a, 42a normally outward pressed against the extension sections 21a, 22a of the clamping arms 21, 22, respectively. In the illustrated first embodiment, the fulcrums 3a, 3b are pivot shafts. However, in other operable embodiments, the fulcrums 3a, 3b can also be pivot points or other functional equivalent element. In addition, in the illustrated first embodiment, the restoring elements 41, 42 can be springs or other elastic elements.

Figure 3:
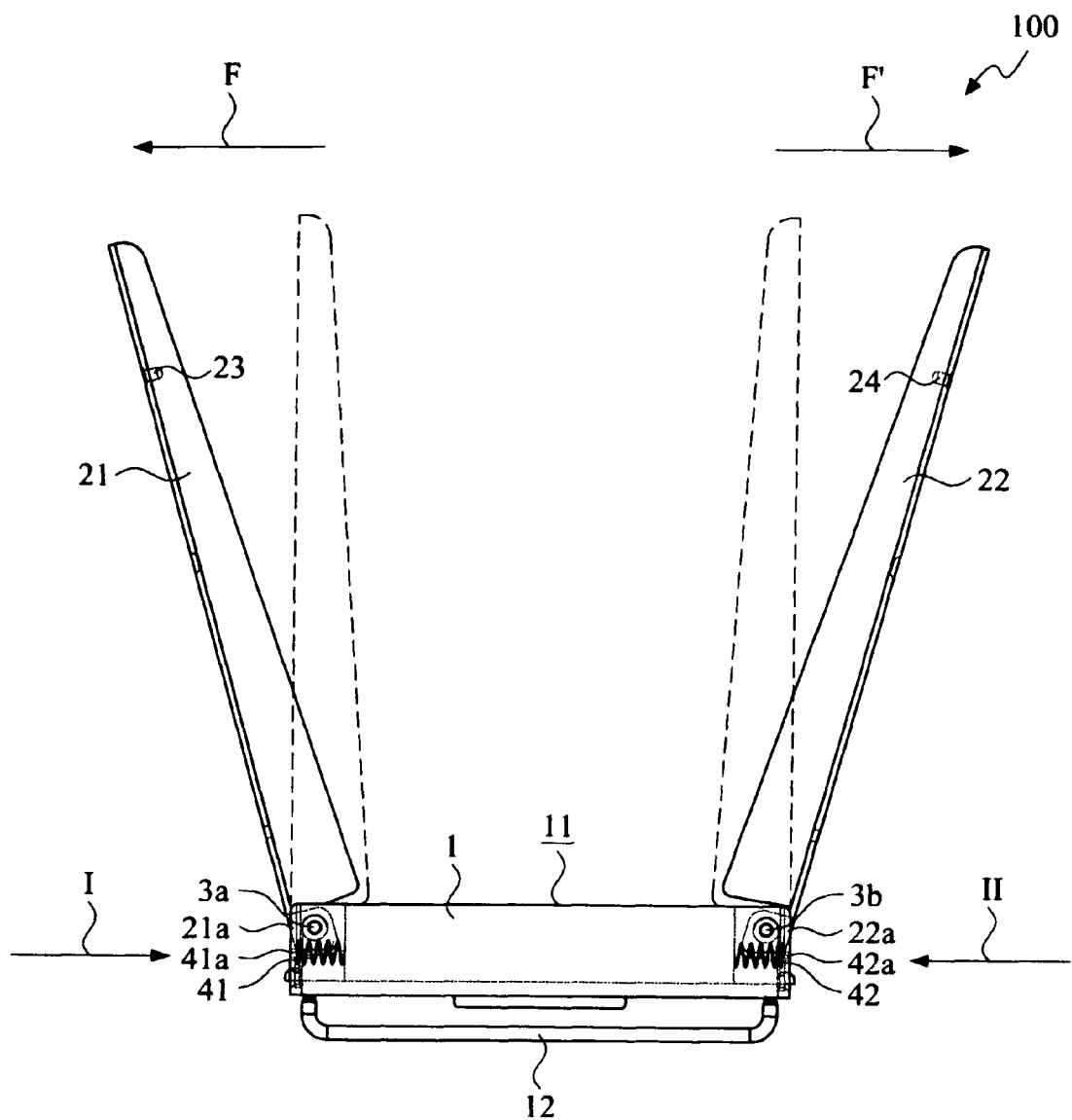
FIG. 3 shows the manner in which the clamp-type hard disk mount of FIG. 2 operates.

Please now refer to FIG. 3, which shows the manner in which the clamp-type hard disk mount 100 operates. When it is desired to install a hard disk 5 on the clamp-type hard disk mount 100, a user may simply apply two laterally outward forces F, F' to pull the two clamping arms 21, 22 away from each other. At this point, the extension sections 21a, 22a of the two clamping arms 21, 22 are moved in the directions I, II, respectively, to press against the push ends 41a, 42a of the restoring elements 41, 42 and thereby compress the restoring elements 41, 42.

On the other hand, when the user stops applying the forces F, F', the extension sections 21a, 22a of the clamping arms 21, 22 are automatically pushed outward by an elastic restoring force of the two compressed restoring elements 41, 42, so that the clamping arms 21, 22 are pivotally turned about the two fulcrums 3a, 3b to their original clamping positions.

In another embodiment of the present invention, one of the two clamping arms 21, 22 may be fixedly connected to one lateral end of the base 1 while the other one of the clamping arms 21, 22 is pivotally turnably connected to the other lateral end of the base 1.

Figure 4:
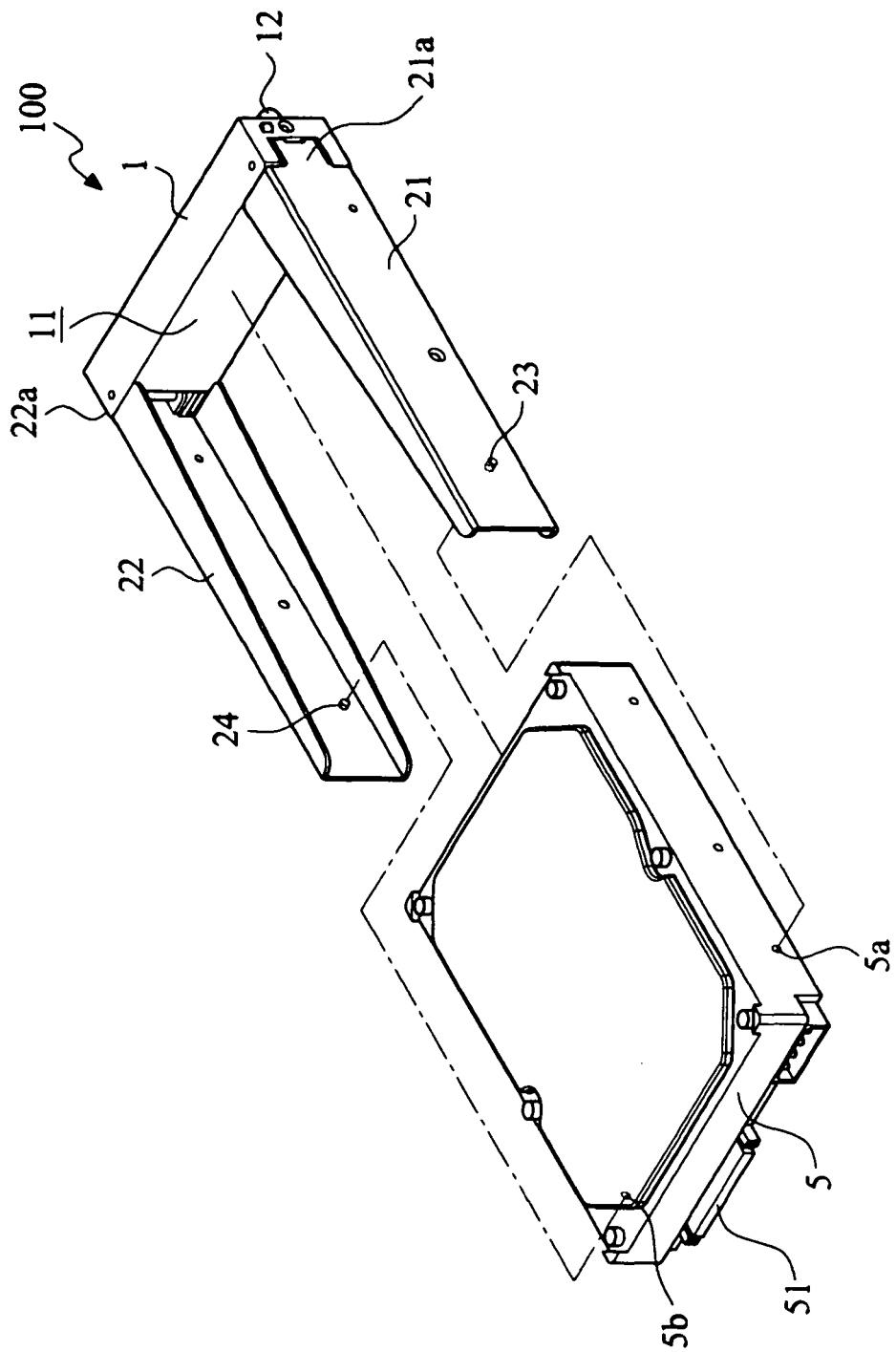
FIG. 4 is an exploded perspective view showing the clamp-type hard disk mount of FIG. 2 and a hard disk for installing on the hard disk mount.
Figure 5:
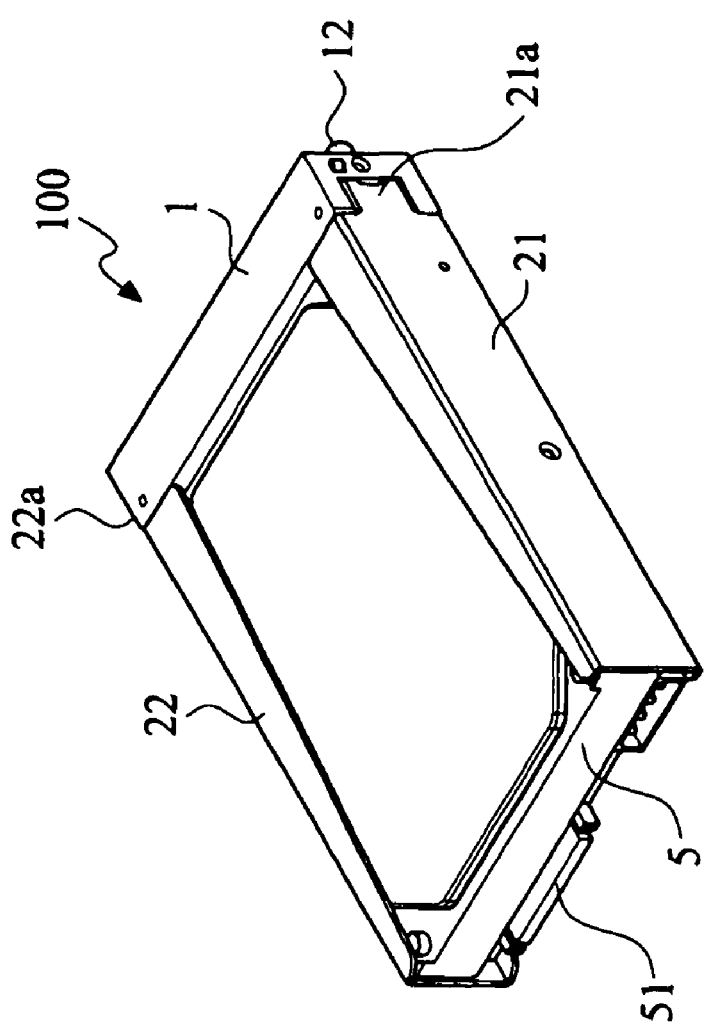
FIG. 5 is an assembled view of FIG. 4.

FIGS. 4 and 5 are exploded and assembled perspective views, respectively, showing the installation of a hard disk 5 on the clamp-type hard disk mount 100 according to the first embodiment of the present invention. Please refer to FIGS. 4 and 5 at the same time. As shown, when the two clamping arms 21, 22 have been pulled away from each other in the manner described with reference to FIG. 3, the hard disk 5 can be inserted into the clamp-type hard disk mount 100 to contact with the hard disk contact surface 11 on the base 1. Then, when the two clamping arms 21, 22 are released, they are pushed by the restoring elements 41, 42 to automatically clamp on the two lateral sides of the hard disk 5 with the two short rods 23, 24 at the front ends of the clamping arms 21, 22 engaged with the retaining holes 5a, 5b on the two lateral sides of the hard disk 5.

After the hard disk 5 is installed on the clamp-type hard disk mount 100, the clamp-type hard disk mount 100 together with the hard disk 5 may be forward pushed into a desired hard disk bay with a connector 51 provided on a front end of the hard disk 5 connected to a mating connector in the hard disk bay.

Figure 6:
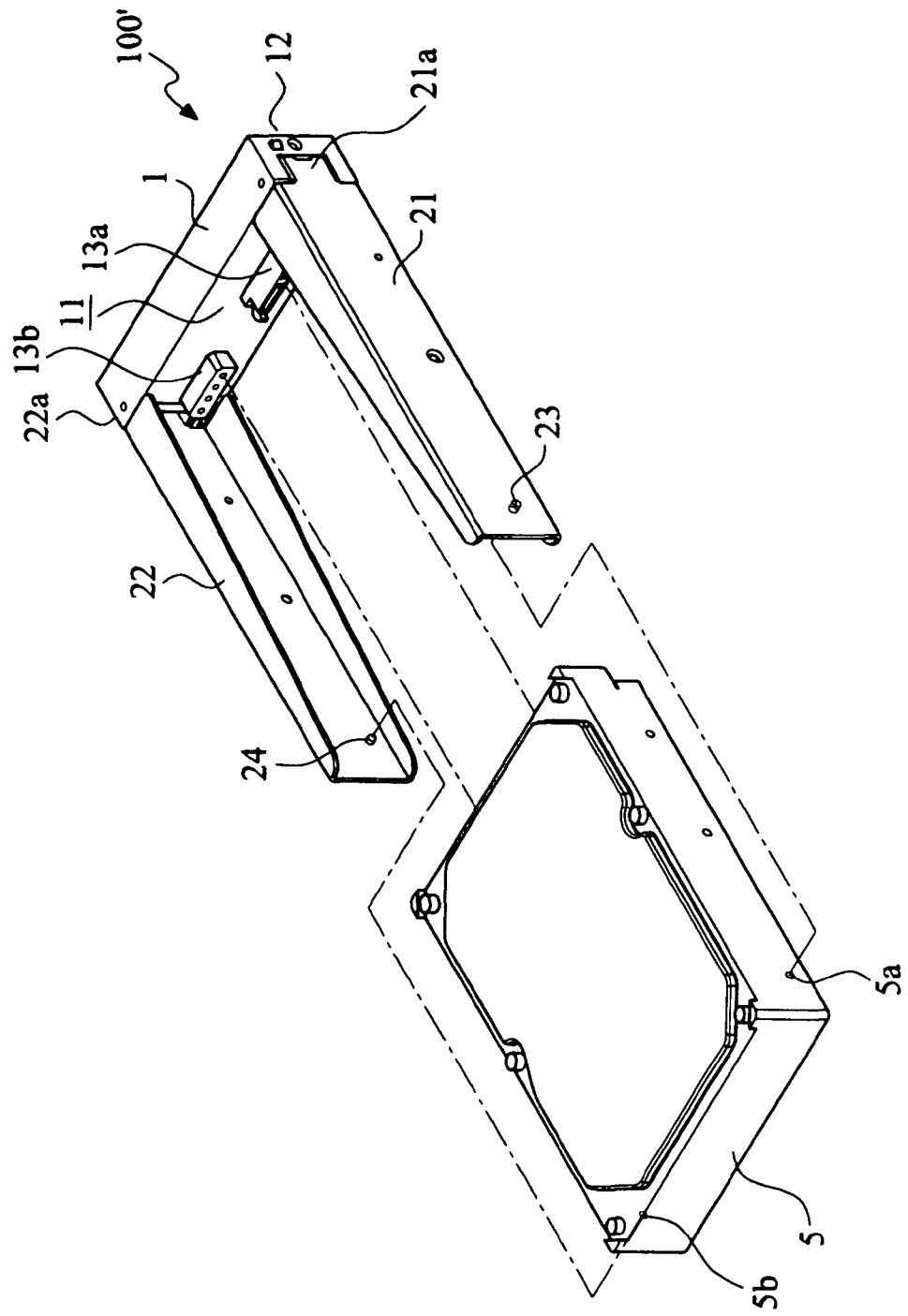
FIG. 6 is an exploded perspective view of a clamp-type hard disk mount according to a second embodiment of the present invention and a hard disk for installing on the hard disk mount.

FIG. 6 shows a clamp-type hard disk mount 100' according to a second embodiment of the present invention before a hard disk 5 is installed thereon. As shown, the clamp-type hard disk mount 100' in the second embodiment is generally structurally similar to the clamp-type hard disk mount 100 in the first embodiment, except that the base 1 in the second embodiment is provided on the hard disk contact surface 11 with two female connectors 13a, 13b. When it is desired to install a hard disk 5 on the clamp-type hard disk mount 100', a user can simply apply two laterally outward forces to pull the clamping arms 21, 22 away from each other. At this point, the extension sections 21a, 22a of the clamping arms 21, 22 are moved into the base 1 toward each other to compress the restoring elements 41, 42. Then the hard disk 5 can be installed on the clamp-type hard disk mount 100' with the male connector 51 on the hard disk 5 engaged with a corresponding one of the female connectors 13a, 13b provided on the hard disk contact surface 11 of the base 1. Then, the clamping arms 21, 22 are released. At this point, under the action of the restoring elements, the clamping arms 21, 22 automatically return to their original positions to clamp on the two lateral sides of the hard disk 5 with the short rods 23, 24 at the front ends of the clamping arms 21, 22 engaged with the retaining holes 5a, 5b formed on the two lateral sides of the hard disk 5.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A clamp-type hard disk mount, comprising:
   a base being provided at a predetermined position with a hard disk contact surface;
   two clamping arms being pivotally connected near respective rear ends to two fulcrums provided in and near two lateral ends of the base, so as to forward extend from the two lateral ends of the base; the two clamping arms respectively having an extension section rearward extended beyond the fulcrums, and two short rods respectively provided near front ends of the clamping arms corresponding to two retaining holes formed on two lateral sides of a hard disk; and
   two restoring elements being provided in the base with two push ends normally outward pressed against the extension sections of the clamping arms;
   whereby when a hard disk is installed on the clamp-type hard disk mount, due to an action of the restoring elements, the two clamping arms automatically clamp on the two lateral sides of the hard disk with the two short rods provided near the front ends of the clamping arms engaged with the retaining holes formed on the two lateral sides of the hard disk.

2. The clamp-type hard disk mount as claimed in claim 1, wherein the restoring elements are selected from the group consisting of springs and other elastic elements.

3. The clamp-type hard disk mount as claimed in claim 1, wherein each of the fulcrums is selected from the group consisting of a pivot shaft and a pivot point.

4. The clamp-type hard disk mount as claimed in claim 1, wherein the base is provided on the hard disk contact surface with at least one connector.

* * * * *